US005647608A

United States Patent [19]
Damman et al.

[11] Patent Number: 5,647,608
[45] Date of Patent: Jul. 15, 1997

[54] AIR BAG MODULE WITH EXTRUDED HOUSING

[75] Inventors: Alex Scott Damman, Clayton, Ohio; David James Thomas, Ft. Mitchell, Ky.; Mark Thomas Winters, Troy, Ohio; Daniel Allen Rhule, West Mansfield, Ohio; Jeffrey Alan Shepherd, Troy, Ohio

[73] Assignee: General Motors Corporation, Detroit, Mich.

[21] Appl. No.: 672,596

[22] Filed: Jun. 28, 1996

[51] Int. Cl.⁶ .................................................. B60R 21/20
[52] U.S. Cl. ...................................... 280/728.2; 280/732
[58] Field of Search ............................... 280/728.2, 732, 280/728.1, 743.1

[56] References Cited

U.S. PATENT DOCUMENTS

| | | | |
|---|---|---|---|
| 5,407,226 | 4/1995 | Lauritzen et al. | 280/728.1 |
| 5,407,227 | 4/1995 | Lauritzen et al. | 280/728.1 |
| 5,431,432 | 7/1995 | Webber et al. | 280/728.2 |
| 5,454,586 | 10/1995 | Rogerson | 280/728.2 |
| 5,544,911 | 8/1996 | Vine | 280/728.2 |
| 5,588,669 | 12/1996 | Leonard et al. | 280/732 X |

FOREIGN PATENT DOCUMENTS

| | | | |
|---|---|---|---|
| 4228232 | 3/1994 | Germany | 280/728.2 |
| WO95/15871 | 6/1995 | WIPO . | |

*Primary Examiner*—Christopher P. Ellis
*Attorney, Agent, or Firm*—Kathryn A. Marra

[57] ABSTRACT

An air bag module includes an axially elongated, extruded housing having a nautilus-shaped profile defined by a single continuously extending spiral-shaped wall. The spiral-shaped wall has first and second free ends and the spiral-shaped wall has a generally continually increasing radius of curvature from the first end to the second end. The housing preferably has a decreased radius portion for holding an inflator therein and an increased radius portion for holding an air bag therein. The decreased radius portion has a radius of curvature which is less than a radius of curvature of the increased radius portion.

13 Claims, 3 Drawing Sheets

5,647,608

AIR BAG MODULE WITH EXTRUDED HOUSING

This invention relates to an air bag module having an extruded housing.

BACKGROUND OF THE INVENTION

It is well known in motor vehicles to provide an air bag module mounted beneath an opening in the instrument panel. The module typically includes a metal housing having opposing side walls and end walls defining an air bag deployment opening. The module also typically includes an air bag having a mouth portion mounted to the housing by an air bag retainer. The module typically includes a cover for overlying the housing and for maintaining the air bag in the folded condition. Upon air bag inflation, the cover breaks open and the air bag deploys out from the housing through an opening in the instrument panel.

It is also known in the prior art that the housing my be formed as an extrusion. Extruded housings of the prior art typically have complex shapes with two or more straight side and bottom walls and sharply angled walls which add complexity to the extrusion process. Also, extruded housings of the prior art typically include a secondary manufacturing process or an extra component to provide diffusion of inflator gas.

SUMMARY OF THE INVENTION

The present invention provides alternatives and advantages over the prior art by providing an air bag module having an extruded housing which is lightweight and easy to extrude by eliminating numerous side walls and sharply angled edges. Advantageously, the extruded housing of the present invention has a profile shape for extrusion which is well-balanced to promote an even, balanced flow of material across the profile during the extrusion process. In addition, the extruded housing provides an integrally extruded feature that serves as a diffuser portion without requiring any secondary manufacturing operations or separate parts. Also preferably, the housing includes integrally extruded features which make the cover and air bag easily attachable to the housing without the use of rivets or other traditional fasteners. Preferably, the housing includes an integrally extruded feature that provides for easy attachment of the entire module to a vehicle. Advantageously, the housing is formed by a single spiral-shaped wall that advantageously holds the inflator and air bag in position relative to each other and also serves as a smooth deployment guide for the air bag during inflation. Also advantageously, the housing preferably includes an integral diffuser portion which initially directs inflation gas away from the air bag and the air bag attachment locations.

These advantages are accomplished in a preferred form of the invention by providing an air bag module including an axially elongated inflator for generating inflator gas and an air bag for inflation upon the discharge of the inflator gas from the inflator. The module includes an axially elongated, extruded housing having a nautilus-shaped profile defined by a single continuously extending spiral-shaped wall. The spiral-shaped wall has first and second free ends and the spiral-shaped wall has a generally continually increasing radius of curvature from the first end to the second end. The housing includes an axially extending diffuser opening through which inflator gas is discharged. The diffuser opening extends between the first end of the spiral-shaped wall and an intermediate point on the spiral-shaped wall positioned between the first and second ends of the spiral-shaped walls.

According to other preferred aspects of the invention, the module includes an axially elongated, extruded housing having a nautilus-shaped extrusion profile with a decreased radius portion for holding the inflator therein and an increased radius portion for holding the air bag therein. The decreased radius portion has a radius of curvature which is less than a radius of curvature of the increased radius portion.

Preferably, the module includes an air bag having a mouth portion including opposing side edges each having an air bag retainer bar secured thereto. The housing includes axially extending first and second air bag channels for receiving the air bag retainer bars therein with one of the air bag channels located on the decreased radius portion and the other of the air bag channels located near the second end of the spiral-shaped wall on the increased radius portion.

In accordance with another preferred aspect of the invention, the module includes a cover having enlarged end portions. The housing includes axially extending cover channels shaped for closely receiving the enlarged end portions of the cover therein. Preferably, one of the cover channels is located on the decreased radius portion and another of the cover channels is located near the second end of the spiral-shaped wall on the increased radius portion.

The housing also preferably includes an integrally extruded, axially extending, attachment flange for attaching the entire module to the vehicle. Preferably, the attachment flange is located on the spiral-shaped wall at approximately the intersection of the decreased radius portion and the increased radius portion.

BRIEF DESCRIPTION OF THE DRAWINGS

An embodiment of the present invention is described, by way of example only, with reference to the accompanying drawings in which.

DESCRIPTION OF THE PREFERRED EMBODIMENT

Figure 2:
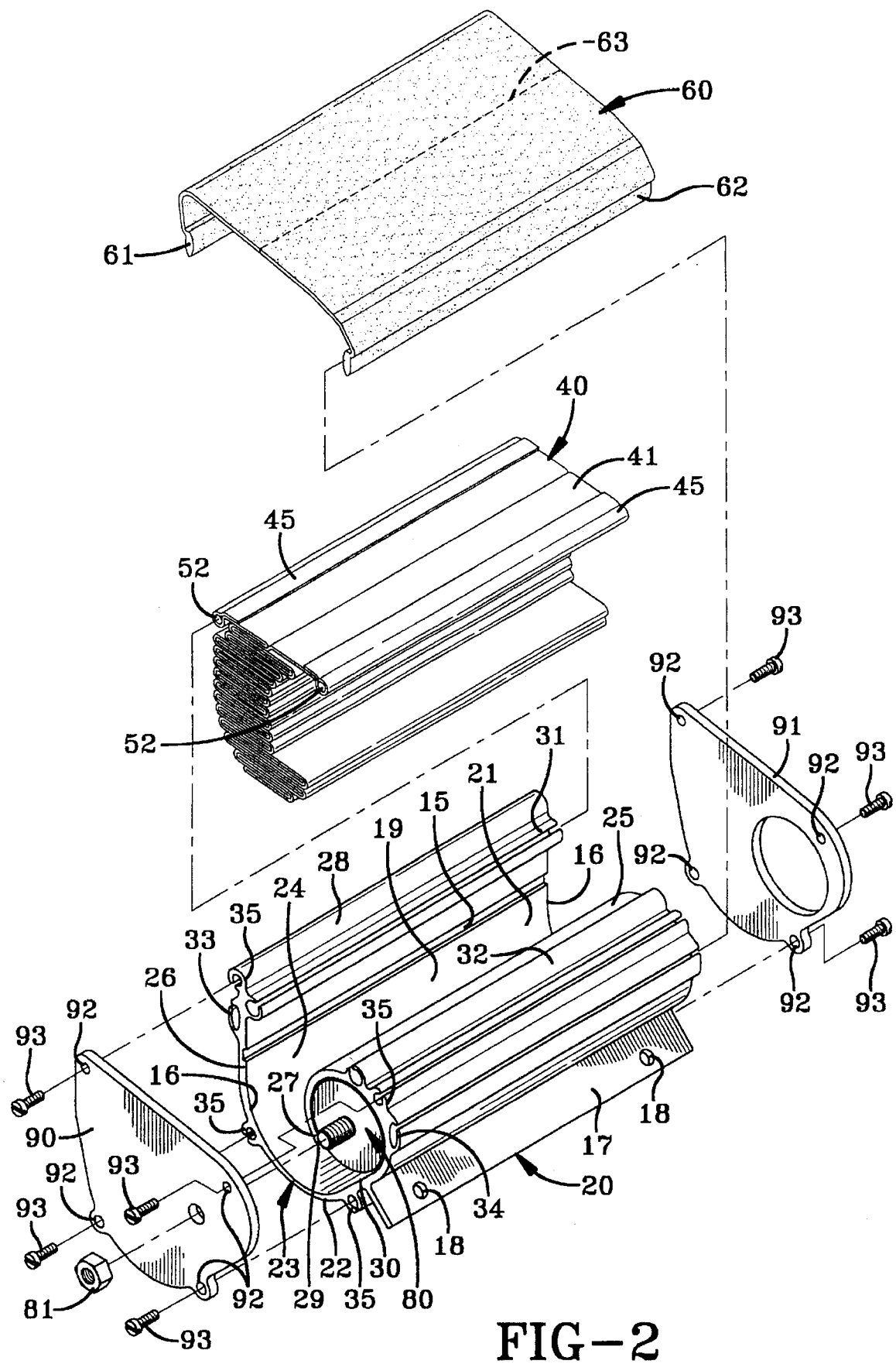
FIG. 2 is an exploded perspective view of the air bag module.

As best shown in FIG. 2, an air bag module 10 generally includes the component parts of an extruded housing 20, an inflator 80 mounted in the housing 20, an air bag 40 secured to the housing 20 and a pair of opposing end plates 90, 91 attached to the housing 20. The entire module 10 is typically mounted beneath an instrument panel (not shown) of a vehicle prior to deployment.

Figure 3:
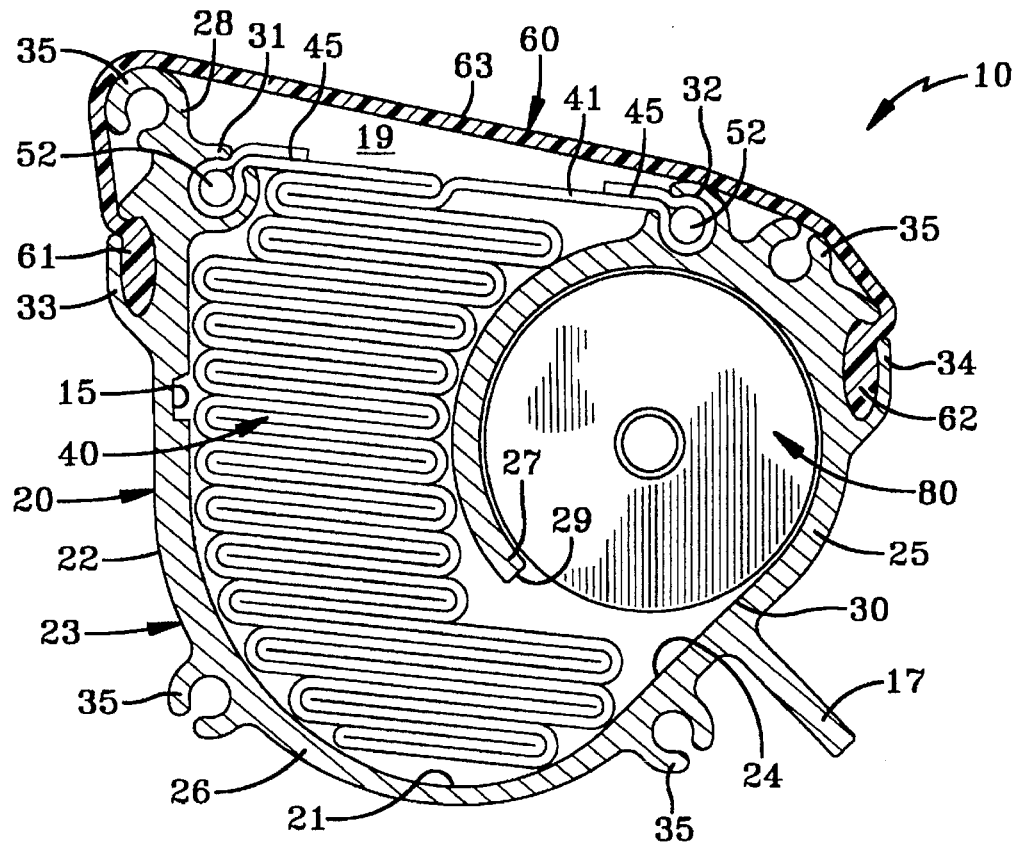
FIG. 3 is cross-sectional view of the air bag module taken along line 3—3 of FIG. 1 and showing the cross-sectional profile shape of the extruded housing.

The housing 20 is an axially elongated, extrusion having an internal surface 21 and an external surface 22. As best shown in FIG. 3, the extrusion forming the housing 20 has a nautilus-shaped profile formed by a single continuously extending spiral-shaped wall 23 defining a nautilus-shaped chamber 24. It will be appreciated that the nautilus-shaped profile is called such since it has a shape similar to that of a shell fish of the genus nautilus having a spiral-shaped shell. The spiral-shaped wall 23 has a generally continually increasing radius of curvature with a decreased radius portion 25 that is advantageously shaped for receiving the inflator 80 therein. The spiral-shaped wall 23 also has an increased radius portion 26 for holding the air bag 40 therein. The increased radius portion 26 has a radius of curvature which is greater than a radius of curvature of the decreased radius portion 25.

Furthermore, the spiral-shaped wall 23 has a free first end 27 positioned at approximately a center of the extruded profile of the housing 20. The spiral-shaped wall 23 curves around itself and terminates at a free second end 28. It will be appreciated that the spiral-shaped wall 23 has a radius of curvature which is lesser at the free first end 27 and greater at the free second end 28.

The extruded housing 20 also includes an axially extending diffuser opening 29 positioned between the free first end 27 of the spiral-shaped wall 23 and an intermediate point, denoted as 30, between the free first and second ends 27, 28 of the spiral-shaped walls. It will be appreciated that the intermediate point 30 is located approximately at the intersection of the decreased radius portion 25 and the increased radius portion 26. The diffuser opening 29 permits the discharge of inflator gas into the air bag 40 upon air bag inflation, as described below.

Advantageously, the diffuser opening 29 is integrally formed by the nautilus shape of the housing 20, such that secondary operations are not needed. Also advantageously, the decreased radius portion 25 holds and acts as a diffuser for the inflator 80 and is naturally positioned to direct the gas away from the air bag 40 and its attachment points to the housing 20 during the initial discharge of inflator gas for an even distribution of inflator gas into the air bag 40. It will be appreciated that size of the diffuser opening 29 is very easily modified simply by changing the length of the spiral-shaped wall 23 at the free first end 27. While the diffuser opening 29 shown in the preferred embodiment shows provides about a 90 degree diffuser opening 29 on the decreased radius portion 26, it will be appreciated that the diffuser opening 29 can preferably vary from about 50 degrees or greater as long as the inflator 80 can still be held in the decreased radius portion 25. The location of the diffuser opening 29 enabled by the housing 20 being a single continuous, spiral-shaped wall 23 makes the diffuser opening 29 an easily extruded feature.

The housing 20 preferably includes first and second axially extending air bag channels 31, 32 which preferably extend along the entire axial length of the housing 20. The first air bag channel 31 is preferably located on the internal surface 21 of increased radius portion 26 of the housing 20 near the free second end 28 of the spiral-shaped wall 23. The second air bag channel 32 is preferably laterally spaced apart from the first air bag channel 31 and is preferably located atop the decreased radius portion 25 of the housing 20 on the external surface 22. The air bag channels 31, 32 are sized and shaped for receiving respective retainer bars 50 which are secured to a mouth portion 41 of the air bag 40 for securing the air bag 40 to the housing 20 without the use of fasteners, as described further hereinafter. The air bag channels 31, 32 are advantageously located at a position on the housing 20 away from the diffuser opening 29 for reduction and better distribution of the load of the discharging inflator gas thereon during air bag 40 inflation.

The housing 20 preferably includes first and second axially extending cover channels 33, 34 which preferably extend along the entire axial length of the housing 20. The first cover channel 33 is preferably located on the external surface 22 of the increased radius portion 26 of the housing 20 near the free second end 28 of the spiral-shaped wall 23.

The second cover channel 34 is preferably laterally spaced apart from the first cover channel 33 and is preferably located atop the decreased radius portion 25 of the housing 20 on the external surface 22. Both of the cover channels 33, 34 are preferably located laterally outward from the respective air bag channels 31, 32 such that the assembled cover 60 will completely overlie the air bag 40 to maintain the air bag 40 in the folded condition, as described below. The cover channels 33,34 are sized and shaped for receiving respective first and second enlarged end portions 61, 62 on the cover 60 therein to slidably secure the cover 60 to the housing 20 without the use of fasteners, as described further hereinafter.

A housing opening 19 through which the inflating air bag 40 deploys is defined between the free second end 28 of the spiral-shaped wall 23 and the decreased radius portion 25. Advantageously, the increased radius portion 26 of the spiral-shaped wall 23 provides a smooth surface for guiding the air bag 40 during deployment out through the housing opening 20. The cover 60 advantageously closes the housing opening 19 prior to air bag deployment.

The extruded housing 20 also preferably includes an integrally extruded and axially extending attachment flange 17 which is preferably located at approximately the junction of the decreased and increased radius portions 25, 26 of the spiral-shaped wall 23. The attachment flange 17 can be used to attach the entire module 10 to the vehicle by the attachment of fasteners (not shown) through flange apertures 18 for attachment to any suitable vehicle structure.

The housing 20 also preferably includes a plurality of axially extending fastener channels 35 extending the entire axial length of the extrusion and being generally spaced apart around the external surface 22 of the housing 20. Preferably, a fastener channel 35 is located between each of the air bag and cover channels 31, 32, 33, 34 on opposing sides of the housing 20 and two other fastener channels 35 are preferably located on opposing lower sides of the external surface 22 of the housing 20.

As best shown in FIG. 2, the module 10 preferably includes first and second end plates 90, 91 for closing the opposing open ends 16 of the extruded housing 20 for axially trapping the inflator 80, the air bag 40 and the cover 60 therein, as described further hereinafter. The end plates 90, 91 each include a plurality of fastener apertures 92 therethrough. The module 10 includes a plurality of fasteners 93 for insertion through fastener apertures 92 in the end plates 90, 91 to secure the end plates 90, 91 to housing 20 via the fastener channels 35.

The module 10 includes the axially elongated inflator 80 for discharging inflator gas upon sensing predetermined vehicle conditions to inflate the air bag 40. The inflator 80 is preferably of a thrust-neutral hybrid construction which discharges gas locally at one reduced end (not shown) having discharge ports thereon. The inflator 80 is mounted on the internal surface 21 of the decreased radius portion 25 of the housing 20 and is easily axially inserted therein during assembly. The inflator 80 preferably has a radius which is slightly smaller than a radius of curvature of the decreased radius portion 25 such that the discharging inflator gas can travel along the axial length of the decreased radius portion 25 and more easily be directed and distributed out through the diffuser opening 29.

Figure 1:
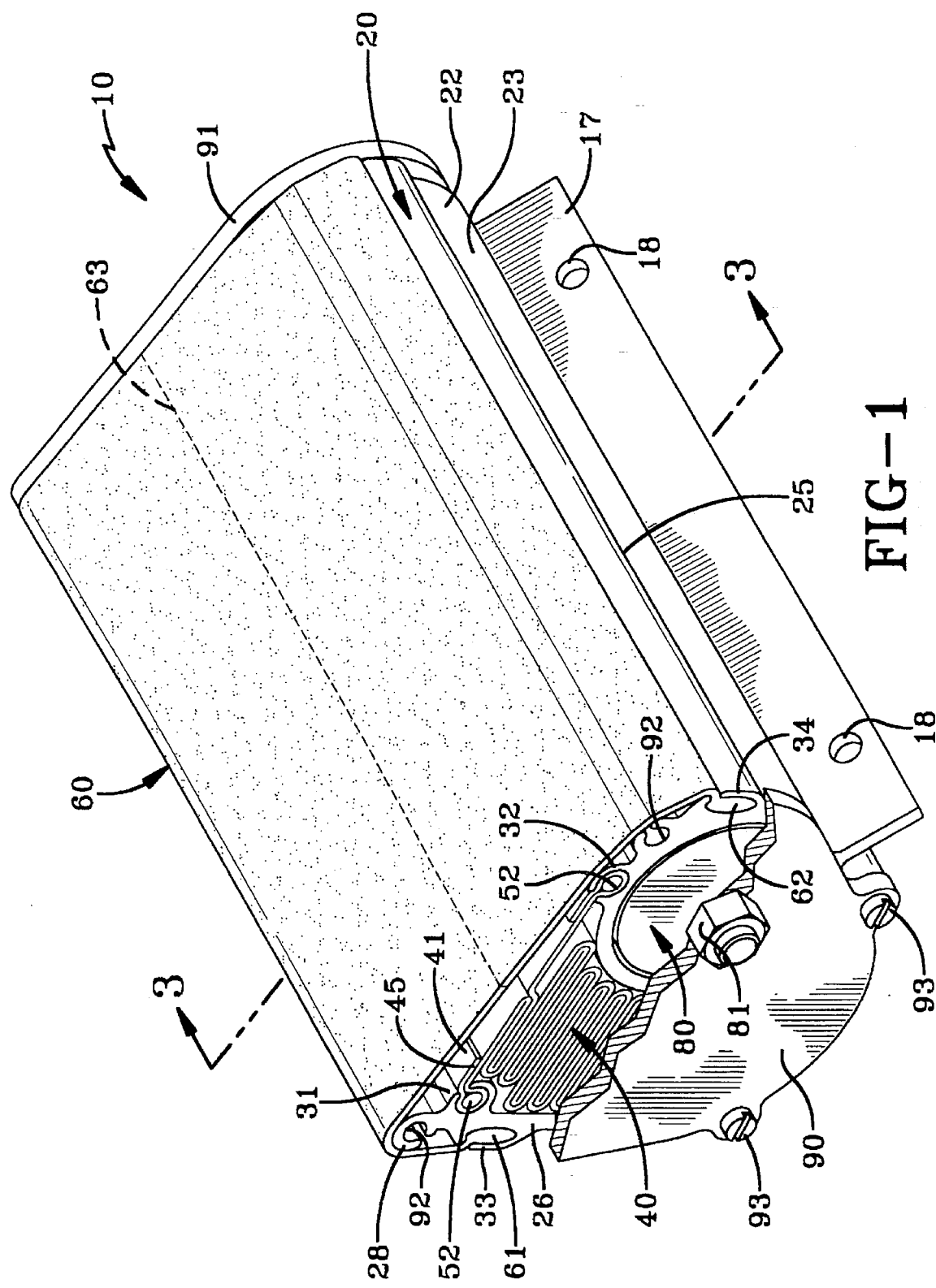
FIG. 1 is an assembled perspective view of the air bag module showing an end plate partially broken away.

Referring to FIGS. 1, 2 and 3, the air bag 40 is made of a conventional fabric material and is normally stored in a folded condition within the increased radius portion 26 of the nautilus chamber 24 of the housing 20. The air bag 40 includes a mouth portion 41 forming an air bag opening for receiving inflator gas therethrough. The mouth portion 41 includes axially extending, opposing side edges 45.

The module 10 also includes a pair of axially elongated retainer bars 52 each preferably being a one-piece continuous extrusion formed of a plastic material. The side edges 45 of the air bag 40 are preferably wrapped around the retainer bars 52 and connected onto themselves, such as by sewing, to connect the retainer bars 52 to the air bag 40. The retainer bars 52 are sized and shaped for closely mating with the air bag channels 31, 32 formed on the extruded housing 20. The retainer bars 52 preferably are shown as generally circular for matching the generally circular shape of the air bag channels 31, 32 on the housing 20. However, it will be appreciated that any mating geometrical shapes of the retainer bars 52 and the air bag channels 31, 32 of the housing 20 may be possible, such as rectangular, oval or others.

Preferably, the module 10 includes a cover 60 which is preferably made of a plastic material by injection molding or extrusion. The cover 60 includes a weakened tear seam 63 extending axially along its length which breaks when pressure is exerted thereon by a deploying air bag 40. The cover 60 includes axially extending, downwardly projecting opposing enlarged end portions 61, 62 thereon. The enlarged end portions 61, 62 of the cover 60 are preferably sized and shaped for closely mating with the cover channels 33, 34 formed on the extruded housing 20. The enlarged end portions 61, 62 preferably are shown as generally oval for matching the generally oval shape of the cover channels 33, 34 on the housing 20. However, it will be appreciated that any mating geometrical shapes of the enlarged end portions 61, 62 and the cover channels 33, 34 of the housing 20 may be possible, such as rectangular, circular or others.

Preferably, the housing 20 includes a weakened portion 15 which is preferably provided by an extruded groove formed on the extruded housing. The weakened portion 15 is preferably located on the increased radius portion 26 of the spiral-shaped wall 23 such that the spiral-shaped wall 23 of the housing 20 will absorb energy by deformation when impacted by an object, especially during certain predetermined vehicle events in which the air bag 40 does not deploy. Advantageously, the weakened portion 15 is an integral part of the extrusion and no secondary operations are needed.

The air bag module 10 is generally assembled as follows. After the retainer bars 52 are attached to the air bag 40 and the air bag 40 is in a folded condition, the air bag 40 is placed within the nautilus-shaped chamber 24 of the housing 20 within the increased radius portion 26 of the spiral-shaped wall 23 of the housing 20. Simultaneously, the retainer bars 52 are each coaxially aligned with the air bag channels 31, 32 on the housing 20 and axially slid therein for attachment to the housing 20. Next, the cover 60 is attached to the housing 20 by axially sliding the enlarged end portions 61, 62 of the cover 60 into the respective cover channels 33, 34. Also the inflator 80 is axially inserted into the decreased radius portion 25 of the housing 20. The end plates 90, 91 are attached to the opposing open ends 16 of the housing 20 to axially trap the inflator 80, the enlarged end portions 61, 62 of the cover 60, and the retainer bars 52 within the housing 20 to secure the cover 60, air bag 80 and inflator 80 within the housing 20. One of the end plates 90 is preferably attached to the housing 20 prior to attachment of the air bag 40 and cover 60 and the other of the end plates 91 is preferably attached to the housing 20 prior to or with the inflator 80 as the last step in the assembly of the module 10.

Fasteners 93 are used to hold the end plates 90, 91 to the housing 20 via the fastener channels 35 and a nut 81 is used to secure the inflator 80 to the end plate 90.

Upon the sensing of predetermined vehicle conditions, the inflator 80 generates inflator gas and discharges the inflator gas which is directed out through the diffuser opening 29 such that the inflator gas is distributed more evenly across the air bag 40. The air bag 40 fills with inflator gas and breaks open the tear seam 63 of the cover 60 for deployment out through the housing opening 19. The air bag 40 and cover 60 remain anchored to the housing 20 during deployment by the trapping of the retainer bars 52 and enlarged end portions 61, 62 within the air bag and cover channels 31, 32, 33, 34, respectively. The inflator 80 is securely positioned within the housing 20 by being trapped in the decreased radius portion 25 of the spiral-shaped wall 23. Advantageously, the inflator gas is directed downwardly and is distributed evenly across the air bag 40 by the diffuser opening 29 located between the free first end 27 of the spiral-shaped wall 23 and the intermediate point 30 on the spiral-shaped wall 23. Also advantageously, the air bag 40 is directed during deployment by the smooth contour of the spiral-shaped wall 23 without having any tight corners to impede its flow during deployment.

It will be appreciated that advantageously, the extruded housing 20 having a spiral-shaped wall 23 defining a nautilus-shaped chamber 24 is easy to extrude since typical numerous side walls and sharply angled edges on housing walls are eliminated. Advantageously, the extruded housing 20 of the present invention has a nautilus-shaped profile for extrusion which is well-balanced across the extrusion die to promote even flow of material during the extrusion process. In addition, the extruded housing 20 provides an integrally extruded decreased radius portion 25 that serves as a diffuser for the inflator gas without requiring any secondary manufacturing operations or separate parts. Also advantageously, the integrally formed diffuser opening 29 directs inflation gas generally away from the air bag 40 such that the heat of inflator gas on the air bag 40 is reduced.

Also advantageously, the housing 20 includes the integrally extruded cover channels 33, 34 and air bag channels 31, 32 which make the cover 60 and air bag 40 easily attachable to the housing 20 without the use of rivets or other traditional fasteners. It will be appreciated that the housing 20 includes a single continuous spiral-shaped wall 23 that advantageously holds the inflator 80 and air bag 40 in position relative to each other and also serves as a smooth deployment guide for the air bag 40 during inflation.

It will be understood that a person skilled in the art may make modifications to the preferred embodiment shown herein within the scope and intent of the claims.

Figure 4:
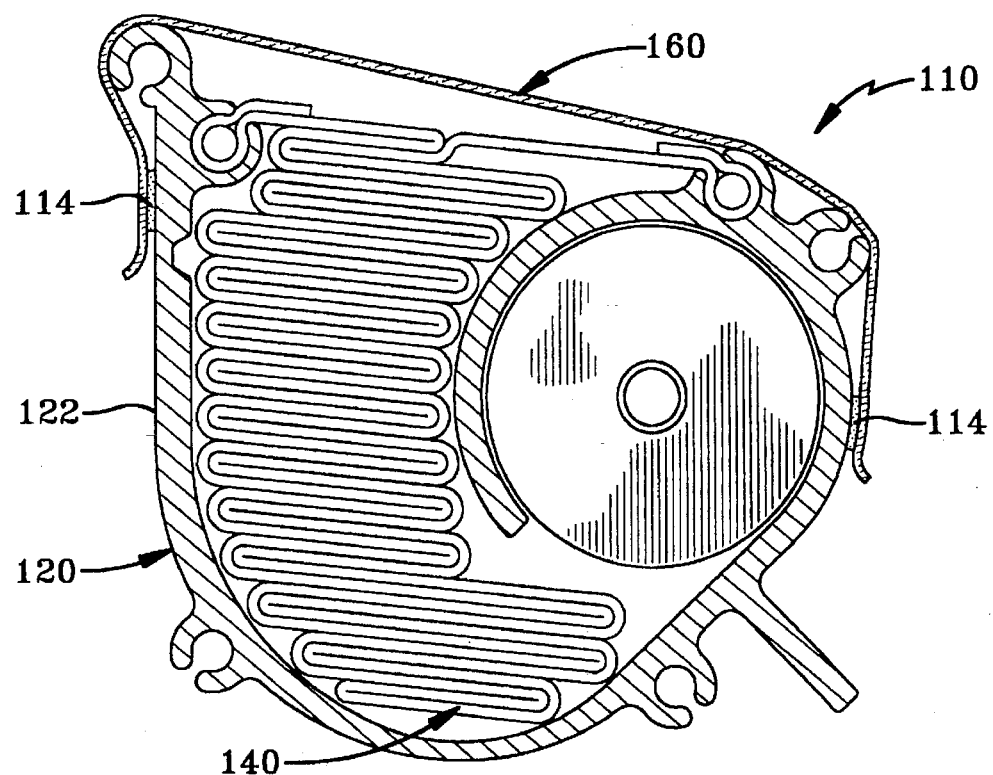
FIG. 4 is a cross-sectional view similar to FIG. 3, but showing an alternate embodiment of the invention.

FIG. 4 shows an alternate air bag module 110 having a housing 120 which is similar to the embodiment shown in FIGS. 1–3. The module 110 differs from that shown in FIGS. 1–3 in that the cover 160 is made of a soft paper-like material, such as that sold under the trademark name TYVEK, which is attached to an external surface 122 of the housing 120, such as by a double-sided adhesive tape 114. This embodiment is useful when a soft-pack module 110 is desired or when the cover 160 is mainly used for maintaining an air bag 140 in the folded condition during shipping. A separate show cover (not shown) may be provided in the instrument panel or other part of the vehicle under which the air bag module 110 is stored.

While the present invention has been described as carried out in a specific embodiment thereof, it is not intended to be limited thereby but is intended to cover the invention broadly within the scope and spirit of the claims.

What is claimed is:

1. An air bag module for use in a vehicle, the module comprising:

an axially elongated inflator for generating inflator gas;

an air bag for inflation upon the discharge of the inflator gas from the inflator; and an axially elongated, extruded housing, the housing having a nautilus-shaped extrusion profile with a decreased radius portion for holding the inflator therein and an increased radius portion for holding the air bag therein, the decreased radius portion having a radius of curvature being less than a radius of curvature of the increased radius portion.

2. An air bag module for use in a vehicle, the module comprising:

an axially elongated inflator for generating inflator gas;

an air bag for inflation upon discharge of the inflator gas from the inflator; and an axially elongated, extruded housing having a nautilus-shaped profile defined by a single continuously extending spiral-shaped wall.

3. The module of claim 2 wherein the spiral-shaped wall has first and second free ends and wherein the spiral-shaped wall has a generally continually increasing radius of curvature from the first end to the second end.

4. The module of claim 2 wherein the spiral-shaped wall has a free first end positioned at approximately a center of the housing and wherein the spiral-shaped wall curves around itself and terminates at a free second end and wherein the spiral-shaped wall has a radius of curvature being lesser at the first end and greater at the second end.

5. The module of claim 4 wherein the housing includes an axially extending diffuser opening through which inflator gas is discharged, the diffuser opening extending between the first end of the spiral-shaped wall and an intermediate point on the spiral-shaped wall positioned between the first and second ends of the spiral-shaped wall.

6. The module of claim 2 wherein the spiral-shaped wall has a decreased radius portion having a radius of curvature and wherein the spiral-shaped wall has an increased radius portion having a radius of curvature which is greater than that of the decreased radius portion and wherein the inflator is held in the decreased radius portion and wherein the air bag is held in the increased radius portion.

7. The module of claim 6 wherein the module includes an air bag having a mouth portion including opposing side edges each having an air bag retainer bar secured thereto, and wherein the housing includes axially extending first and second air bag channels for receiving the air bag retainer bars therein, wherein one of the air bag channels is located on the decreased radius portion and wherein the other of the air bag channels is located on the increased radius portion.

8. The module of claim 6 wherein the module includes a cover having enlarged end portions and wherein the housing includes axially extending cover channels shaped for closely receiving the enlarged end portions of the cover therein and wherein one of the cover channels is located on the decreased radius portion and wherein another of the cover channels is located on the increased radius portion.

9. The module of claim 6 wherein the housing includes an integrally extruded, axially extending attachment flange for attaching the entire module to the vehicle, the attachment flange being located on the spiral-shaped wall at approximately the intersection of the decreased radius portion and the increased radius portion.

10. The module of claim 6 wherein the spiral-shaped wall has a free first end positioned at approximately a center of the housing and wherein the spiral-shaped wall curves around itself and terminates at a free second end and wherein the spiral-shaped wall has a radius of curvature being lesser at the first end and greater at the second end.

11. The module of claim 10 wherein the housing includes an axially extending diffuser opening through which inflator gas is discharged, the diffuser opening extending between the free first end of the spiral-shaped wall and an intermediate point on the spiral-shaped wall positioned between the free first and second ends of the spiral-shaped wall.

12. The module of claim 11 wherein the intermediate point is located on the spiral-shaped wall at approximately the intersection of the decreased radius portion and the increased radius portion.

13. The module of claim 6 wherein the spiral-shaped wall has a weakened portion located on the increased radius portion.

* * * * *